United States Patent

Page

Patent Number: 5,390,746
Date of Patent: Feb. 21, 1995

[54] SIDE CHOP HOE

[75] Inventor: Ardle E. Page, 1930 Breakwood Cir., Albany, Oreg. 97321

[73] Assignee: Ardle E. Page, Albany, Oreg.

[21] Appl. No.: 11,278

[22] Filed: Jan. 29, 1993

[51] Int. Cl.⁶ .................. A01B 1/22; B25G 1/02
[52] U.S. Cl. ....................... 172/371; 81/489
[58] Field of Search ................ 172/371, 365; 56/DIG. 18; 294/57, 58; 81/489, 491

[56] References Cited

U.S. PATENT DOCUMENTS

| Re. 34,194 | 3/1993 | Stowell et al. | 81/489 X |
|---|---|---|---|
| 132,444 | 10/1872 | Cookerly | 172/371 |
| 1,267,915 | 5/1918 | Schellabarger | 294/57 |
| 1,279,704 | 9/1918 | Jones | 172/371 |
| 2,969,120 | 1/1961 | Randolph | 172/371 |
| 3,942,591 | 3/1976 | Brannin | 172/371 |
| 3,981,043 | 9/1976 | Curry | 172/371 X |
| 4,056,875 | 11/1977 | Buczak | 29/234 |
| 4,246,970 | 1/1981 | Franke | 172/371 X |
| 4,964,192 | 10/1990 | Marui | 81/489 X |

FOREIGN PATENT DOCUMENTS

| 908444 | 8/1972 | Canada | 56/DIG. 18 |
|---|---|---|---|
| 1377634 | 9/1964 | France | 172/371 |
| 958860 | 5/1965 | United Kingdom | 172/371 |

*Primary Examiner*—Randolph A. Reese
*Assistant Examiner*—Christopher J. Novosad

[57] ABSTRACT

A shuffle hoe with a horizontal blade which is designed for chopping the earth with the blade sides as well as weeding with a forward and backward motion with equal efficiency and control. The simple design comprises a diamond shaped blade mounted on a straight handle shaft which has a movable grip handle curved near the opposite upper end and capped by a bicycle grip.

3 Claims, 2 Drawing Sheets

SIDE CHOP HOE

BACKGROUND FIELD OF INVENTION

This invention relates to hand held garden implements specifically to the class of weeders known as hoes.

BACKGROUND-DESCRIPTION OF PRIOR ART

Conventional hoes operate with an up and down chopping motion to remove weeds. This approach is effective but laborious. The operator needs to bend forward to use it. This is hard on the back. Inventors created hoes with flat horizontal blades which use a forward and backward movement. These are used in a shuffling motion just under the soil surface. In this manner they remove weeds and loosen the soil. This type of hoe is commonly referred to as a shuffle hoe. For small weeds or easy to work soils shuffle hoes are more efficient and easier on the operators back than conventional hoes. However shuffle hoes heretofore were ineffective against large weeds or heavy soils. To meet such challenges with hand implements a chopping action is needed. A chopping action uses a swing to build up momentum for a forceful impact and penetration of the soil.

The most effective way to swing a shuffle hoe with a flat horizontal blade is to swing using the blade sides. Heretofore shuffle hoes with flat blades have been unsuitable for chopping with the sides. They were designed mainly for the forward and backward weeding motions. This dominated both the shape of the blade and the handle. A second implement was required to effectively chop large weeds.

Various shuffle hoes with flat horizontal blades have been proposed. Though they are designed well for forward and backward weeding motions, they are awkward or unsuitable for side chopping action. U.S. Pat. No. 35,242 to Solomon (1901) shows a horizontal blade with a handle shank that is not straight but curvalinear near the blade. A chop swinging from the side would cause the blade to turn and the handle to twist during impact. U.S. Pat. No. 201,977 to Mitchell (1965) and U.S. Pat. No. 28,748 to Painter not only have curvalinear shanks near the blade but also irregular overall designs. When chopping with the sides, this irregularity adds unnecessary visual confusion for the operator. The upper handle, curvalinear shank and irregular blade design are not in a straight visual line. Lining such a hoe up with the target would be unnecessarily complex for the eye. The U.S. Pat. No. 234,015 to Pontius (1974) shows a straight handle shank attached directly to the center of a horizontal blade. The blade however is blunt on the right and left sides. This makes it unsuitable for side chopping. U.S. Pat. No. 132,444 to M. Cookerly (1872) and U.S. Pat. No. 1,274,704 to Jones (1918) show my preferred diamond shaped blade. This diamond parallelogram has four cutting edges and four clear points of impact.

All four directions of use forward, backward, to the right and to the left, penetrate with a point. Unfortunately, both Cookerly and Jones show a curvalinear shank attached just before the blade. This renders a forceful side chop ineffective. Cookerly states that his design "is not intended particularly to dig or chop the earth." Jones refers only to a "backward and forward movement in the manipulation of the implement."

Implements comprised of handles with a curve near the upper end of the handle have been proposed for greater blade control. These implements however are not for chopping or weeding; for example, U.S. Pat. No. 150,570 to Heineke (1945), is a design for a scythe used for mowing down weeds above the soil. The lower grip does not easily readjust to the various positions which individual weed removal requires. The handle design is ideal for swinging from the sides. Its blade is too long and narrow for weeding below the soil.

Movable lower grips for tools requiring the use of two hands have been proposed, for example, U.S. Pat. No. 3,981,043 to Curry (1976). This grip is unnecessarily complex and awkward for a tool such as my hoe; it requires "at least one stop" to keep the movable grip from sliding too far. In addition, it requires device to protect the hand from such a stop. This grip is sloppy and frustrating to use on simple tools such as brooms, rakes, or my hoe. It tends to slide back down to the stop when released by the hand. It won't stay put where it was left when released by the hand. This proposed grip is also unnecessarily hard on the hand which it was designed to protect. The hand is subject to injury by the stop. The grip has an uncomfortable surface and could pinch the operators palm. The grip does not completely surround the handle but leaves a narrow gap forming an open slot the full length of the hand position.

OBJECTS

Accordingly, besides the objects and advantages of my hoe as described in the above patent, several objects of the present invention are:

(a) to combine a chopping action with the forward and backward movement of a shuffle hoe in one implement.

(b) to provide in one hoe four directional capability; forward, backward, a swinging chop to the right, and to the left.

(c) to provide a shuffle hoe having a flat horizontal blade with a handle which has a strong rotational control enhancing the blades stability in four directions of use including a side chop.

(d) to provide a hoe with a simple straightforward visual shape which is attractive to the eye and easy for the operator to line up with the target in all four directions of use.

(e) to provide a hoe with an upper hand position which is equally comfortable and effective in all directions including chopping the earth with the blade sides.

(f) to provide a hoe with a new and improved design which is easy on the back and hands.

(g) to provide a new and improved movable grip for the lower hand of implements such as my hoe which require two hands to operate which will protect the hand along the handle in the intermediate area between the tool and the upper handle end.

(h) to provide a movable grip that holds the handle firmly, is easily moved along the handle and rests in place when released by the hand.

Further objects and advantages are to provide a hoe with four directions of use which is easy to use, durable, and inexpensive to manufacture. Further objects and advantages of my invention will become apparent from a consideration of the drawings and ensuing description of it.

DRAWING FIGURES

In the drawings, closely related figures have the same number but different alphabetic suffixes.

DESCRIPTION OF THE PREFERRED EMBODIMENT OF THE INVENTION

Figure 1:
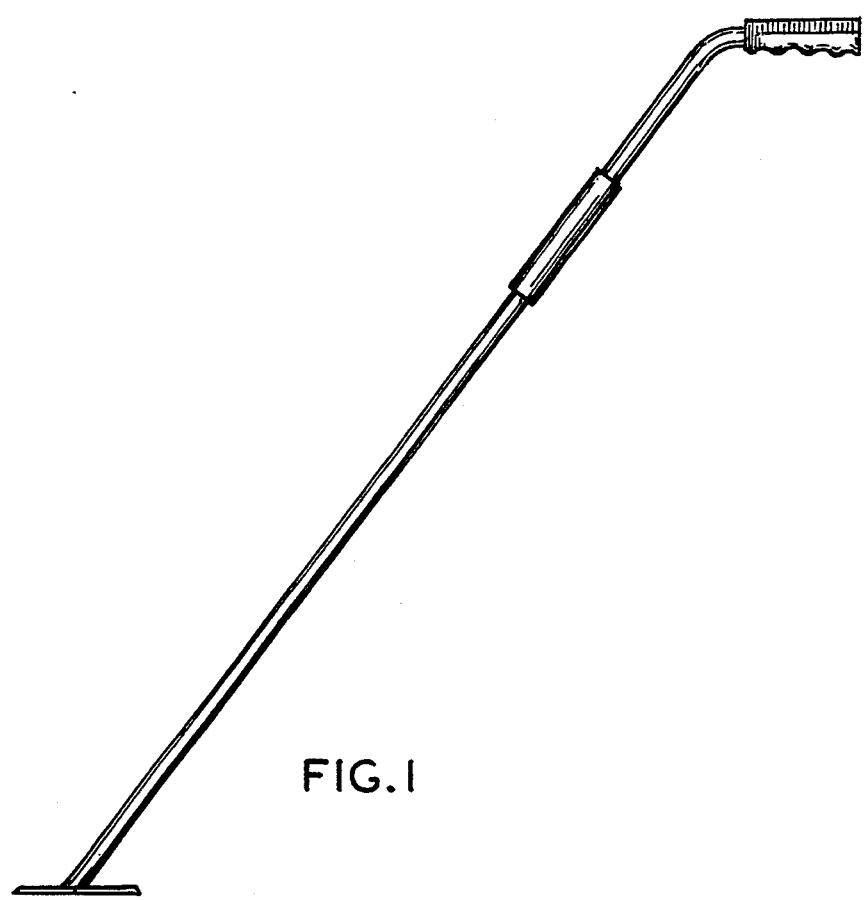
FIG. 1 shows a side elevational view of my new hoe.
Figure 2:
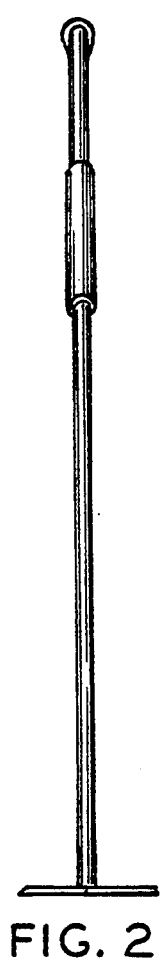
FIG. 2 shows a front elevational view of the same.
Figure 3:
FIG. 3 shows a top plan view of the same.

The overall view of a typical embodiment of the present hoe invention is shown in FIG. 1 (side view) and FIG. 2 (front view) and FIG. 3 (top view) which illustrates the overall design of my invention. FIGS. 1, 2, and 3 show the handle which is typically constructed of steel tubing galvanized inside and out. It is approximately 2.3 cm in diameter and 152 cm long. The handle is typically welded directly to the near center of the blade.

FIG. 1 shows handle 26 tilted upward and rearward beyond rear blade point 24b at approximately a 45 degree angle. Handle 26 forms a start linear shaft beginning at blade 20. The handle is curvalinear on the upper end at handle curve 28. Handle curve 28 bends down to a near horizontal position just before the end of the handle is capped by upper grip 32. The upper grip is typically a bicycle grip of vinyl composition.

Figure 7:
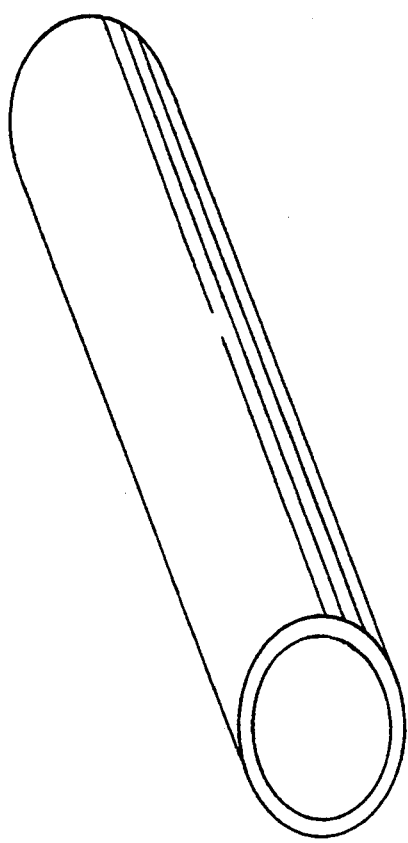
FIG. 7 shows a side elevational view of my lower movable grip.

FIGS. 1, 2, and 3 also show lower movable grip 30 mounted to straight linear portion of handle 26, the lower grip is typically composed of vinyl tubing 15 cm long with a wall thickness of 3 mm. FIG. 7 shows the tubular out of round formation of lower movable grip 30.

Figure 4:
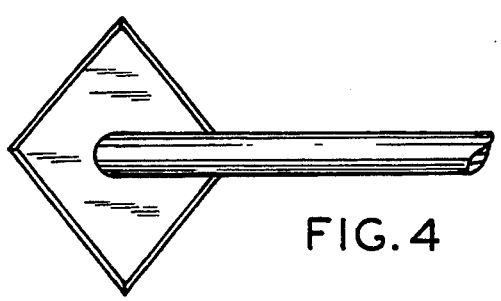
FIG. 4 shows an enlarged fragmented top view of my hoe handle attached to the hoe blade.
Figure 5:
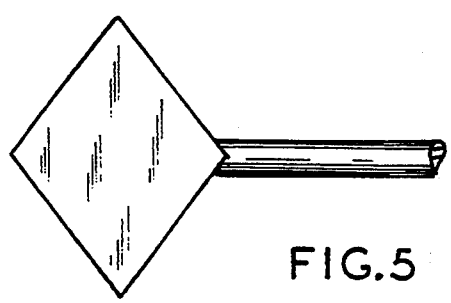
FIG. 5 shows an enlarged fragmental bottom view of the new hoe handle and blade.
Figure 6:
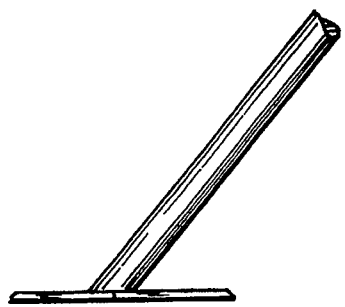
FIG. 6 shows an enlarged fragmented side elevational view of the hose handle attached to the blade.

FIGS. 4, 5, and 6 show enlarged fragmented views of handle 26 mounted on blade 20. FIG. 4 shows the handle centered in relation to front point 24a. It also shows continuous sharpened blade edges surrounding the blades perimeter. FIG. 5 shows my preferred tool, a diamond blade design. Rear point 24b is shown mounted on the center line of handle 26. FIG. 6 shows the representative mounting of the handle with side points 22a and 22b on the approximate center line of handle 26. FIGS. 4, 5 and 6 show all four blade points in line with the center mounted handle 26. The blade is typically composed of 14 gauge carbon steel. Typical overall dimensions are 16 cm from left side point, 22a to right side point, 22b and 14 cm from front point 24a to rear point 22b.

The manner of using the new hoe invention combines a chopping action with all the forward and backward movements of a typical shuffle hoe. FIGS. 4, 5, and 6 show my preferred tool a diamond blade design. All four directions of use penetrate with sharpened edges and streamlined points. Front point 24a and rear point 24b are used mainly for weeding and cultivating with forward and backward shuffling motions. The edges coming off from the front and back blade points face the target more directly then the edges from the blades side points. In the slower push weeding movements, these more abrupt edges prevent deflection. For the faster side chopping action, deflection is not a problem and the more streamlined side points are used.

FIGS. 5 and 6 show handle 26 mounted in the approximately center of blade 20. The four blade points of the blade are each directly in line between the mounting of the hoe handle and its direction of travel. The straight handle shaft near the blade treats all four directions with equal control and stability. This feature allows a forceful side chop without twisting the hoe handle. This straight shaft also provides a central pivot point by which the blade can be manipulated by handle rotation.

FIGS. 1, 2 and 3 show the full length of handle 26 in relation to blade 20. The forceful chopping action is created by the operator swinging the hoe sideways and chopping with the side points 22a and 22b. Usually this is a circular swing and somewhat resembles that of a golf club swing except the hoe operator hands are held farther apart. Like the golfer, the hoe operator can also stand fully erect. Unlike conventional hoes, the blade of the invention is nearly horizontal at impact. This forceful chop lands fully on the blades streamlined side points. It easily penetrates most tough weeds, there are no irregular visual lines near the blade. The hoes point of impact is easily anticipated. This makes the task of hitting a targeted weed simpler for the operator.

FIG. 1 and FIG. 2 show that handle 26 is curvalinear at top end instead of at the bottom end near the blade. Handle curve 28 gives advantages to all four directions of the hoe's use. Upper grip 32 is mounted above handle curve 28.

The handle curve gives a strong torque control over the handle and blade. This gives the operator easy manipulation of the blade side points. This is useful for getting in between plants. This control holds the blade steady during side chopping. All maneuvers are easily accomplished by keeping the hand in the same upper hand position. This is more efficient than a straight handle which would require a switch from above to below the handle when changing from push-pull to a side swinging chop.

FIG. 1, 2, 3, and 7 show lower movable grip 30. The grip protects the lower hand along the full length of the straight shaft of handle 26. The grip is of tubular formation and is moved easily. It is typically formed of vinyl similar to that of a common bicycle grip. The grip can hold the handle firmly in place with a firm grasp of the hand upon the grip. It is formed out of round. This maintains a slight pressure on the surface of the round handle. This allows the grip to stop in place by itself when released by the hand. The grip completely surrounds the handle presenting to the hand an uninterrupted comfortable surface. It is a simple design ideally suitable for otherwise uncomplicated hand-held tools such as my hoe.

Accordingly, the scope of the invention should be determined not by the embodiments illustrated but by the legal claims and equivalents.

I claim:

1. In a garden hoe of a type that has a flat horizontal blade with an elongated handle attached thereto the improvement comprising a movable grip wherein said grip is formed out of round whereby said grip both moves easily yet stops itself and rests in place when released by the hand.

2. In a garden hoe of a type with a flat horizontal blade which is mounted on an elongated handle the improvement wherein the handle comprises a straight linear shaft with an alternate linear angle near an upper end of the handle forming a hand position whereby a hoe operator has greater control over the blade said hoe further including a movable grip formed out of round whereby said grip both moves easily yet stops itself and rests in place when released by the hand.

3. In a combination comprised of an elongated handle of rigid material and a gripping means, the improvement wherein said gripping means is tubular in construction and completely surrounds said handle and wherein an interior diameter of said gripping means is slightly larger than said handle and further an interior of said gripping means differs in shape from an exterior of said handle whereby said gripping means is easily moved along the handle and also holds the handle firmly with a grasp of a hand and yet stops itself and rests in place when released by said hand wherein said gripping means is formed out of round and said elongated handle is round in formation.

* * * * *